C. F. SCHUESSLER.
POWER ATTACHMENT FOR KNITTING MACHINES.
APPLICATION FILED NOV. 15, 1909.
1,135,212.
Patented Apr. 13, 1915.
6 SHEETS—SHEET 1.
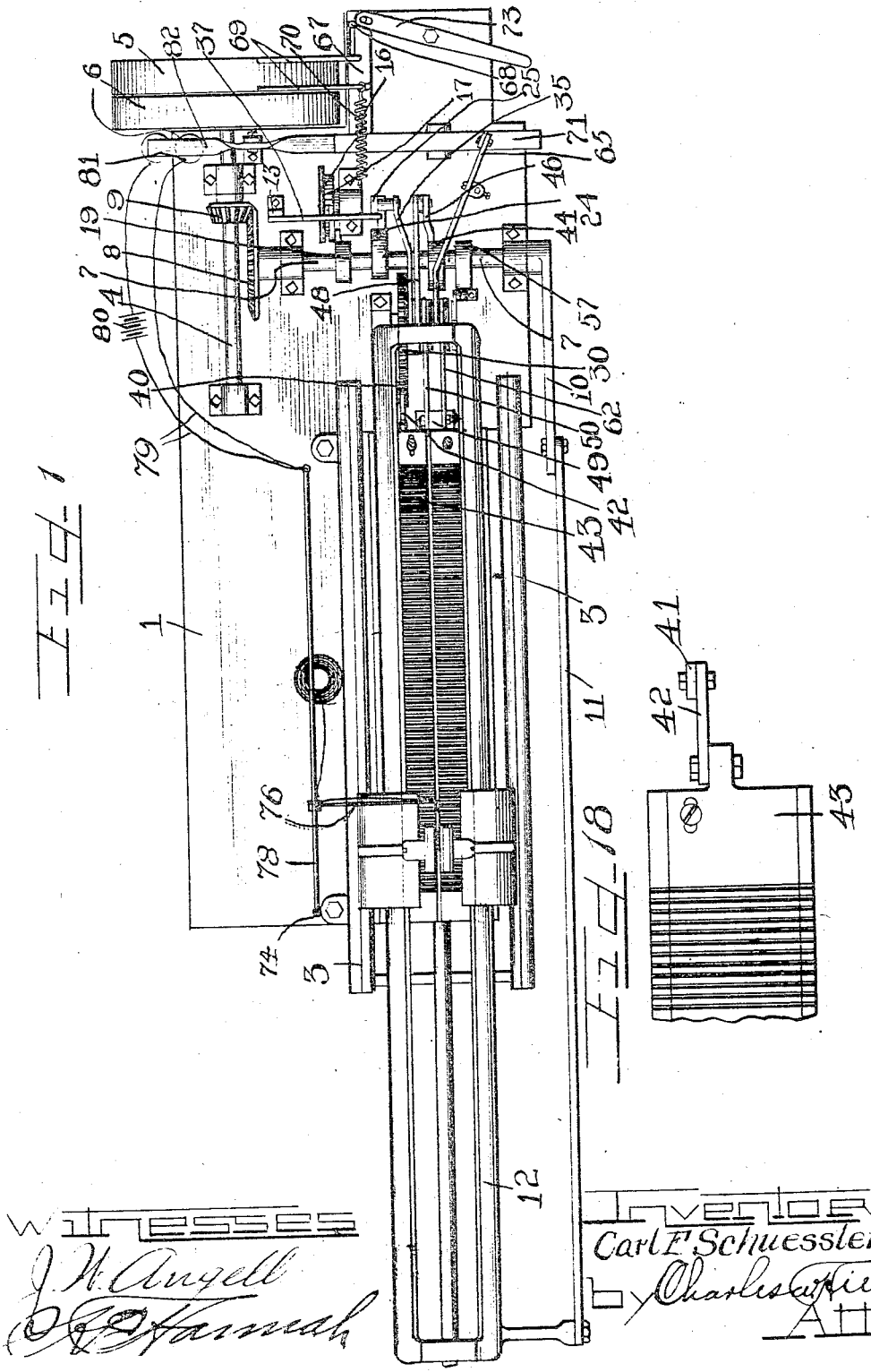

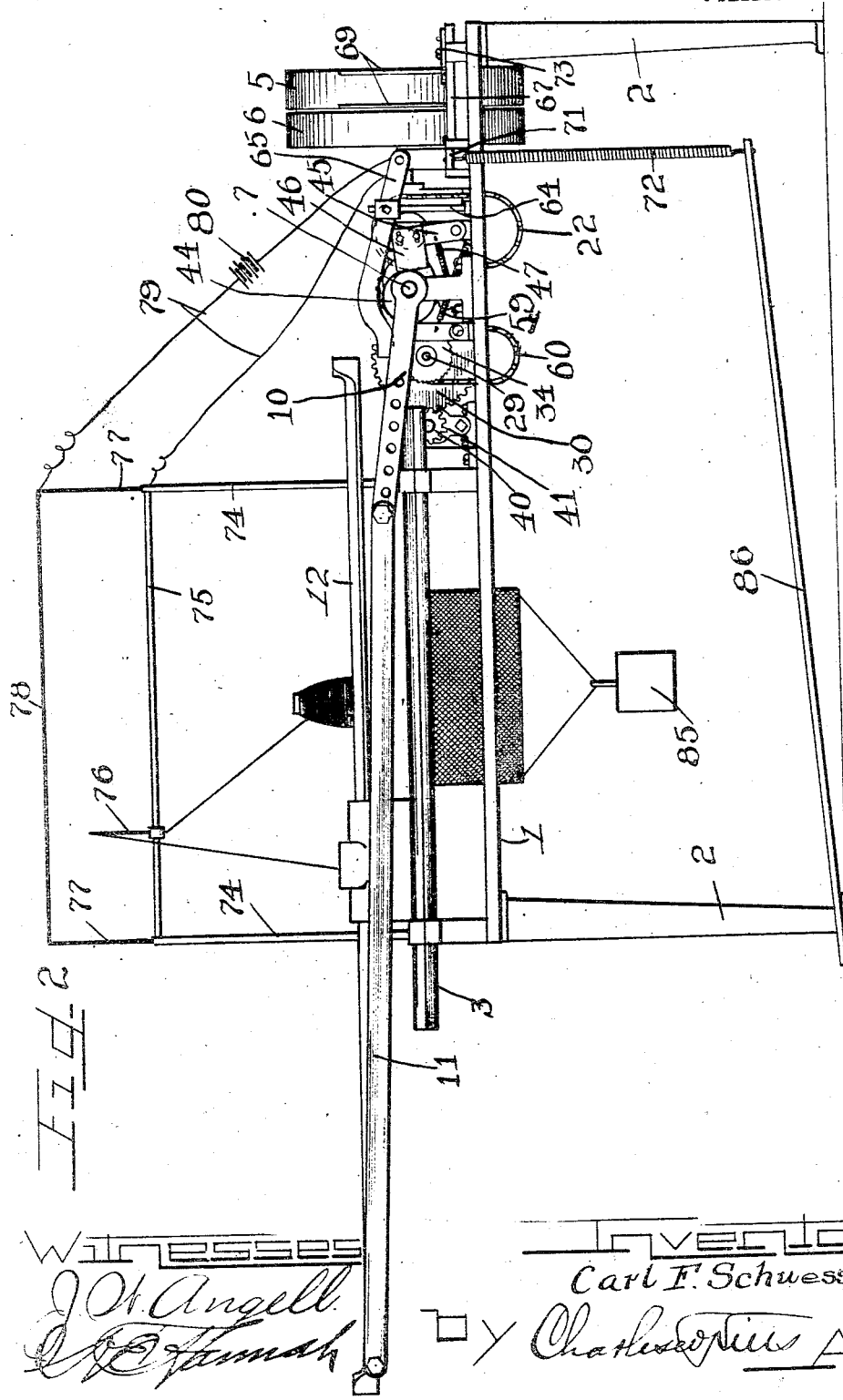

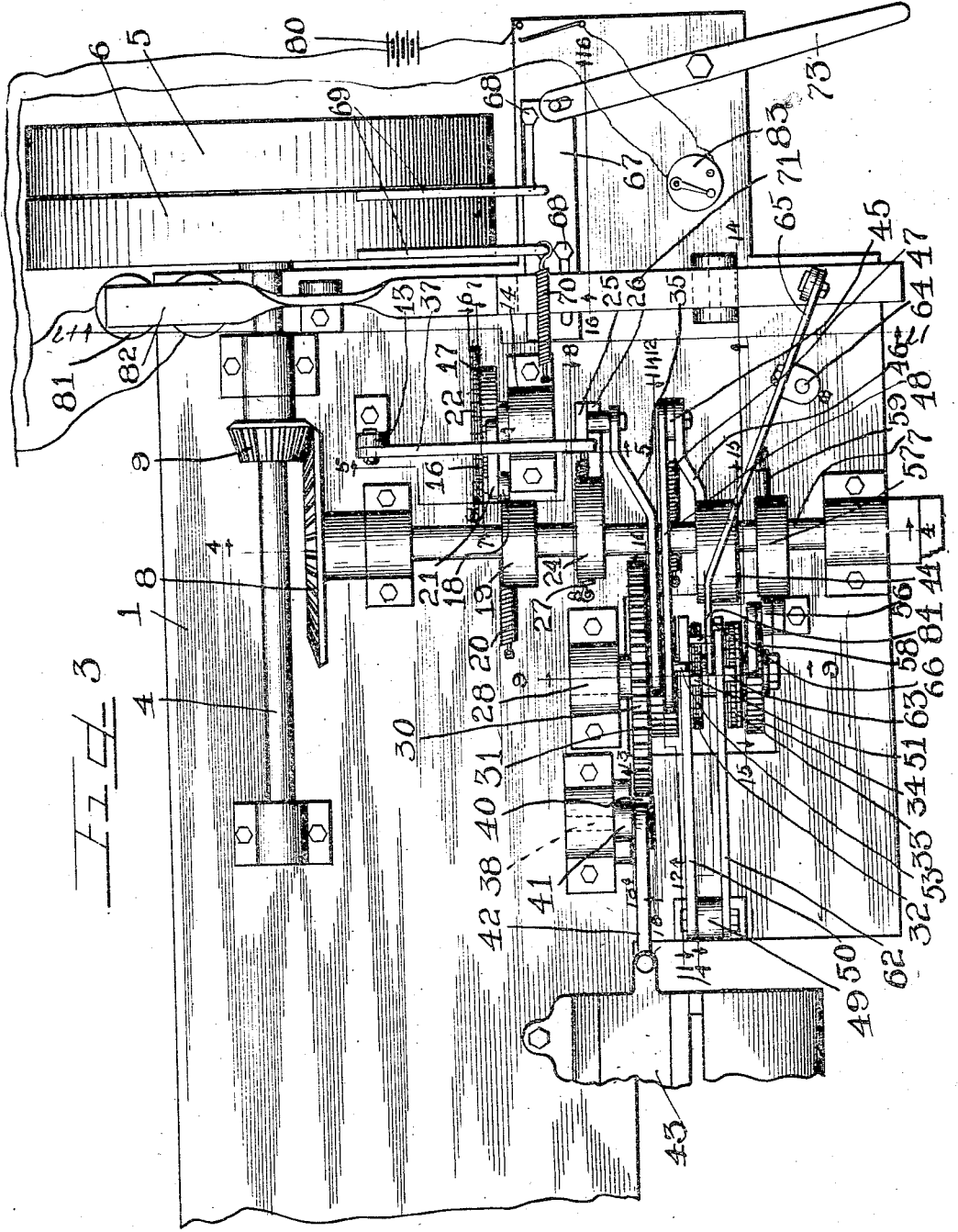

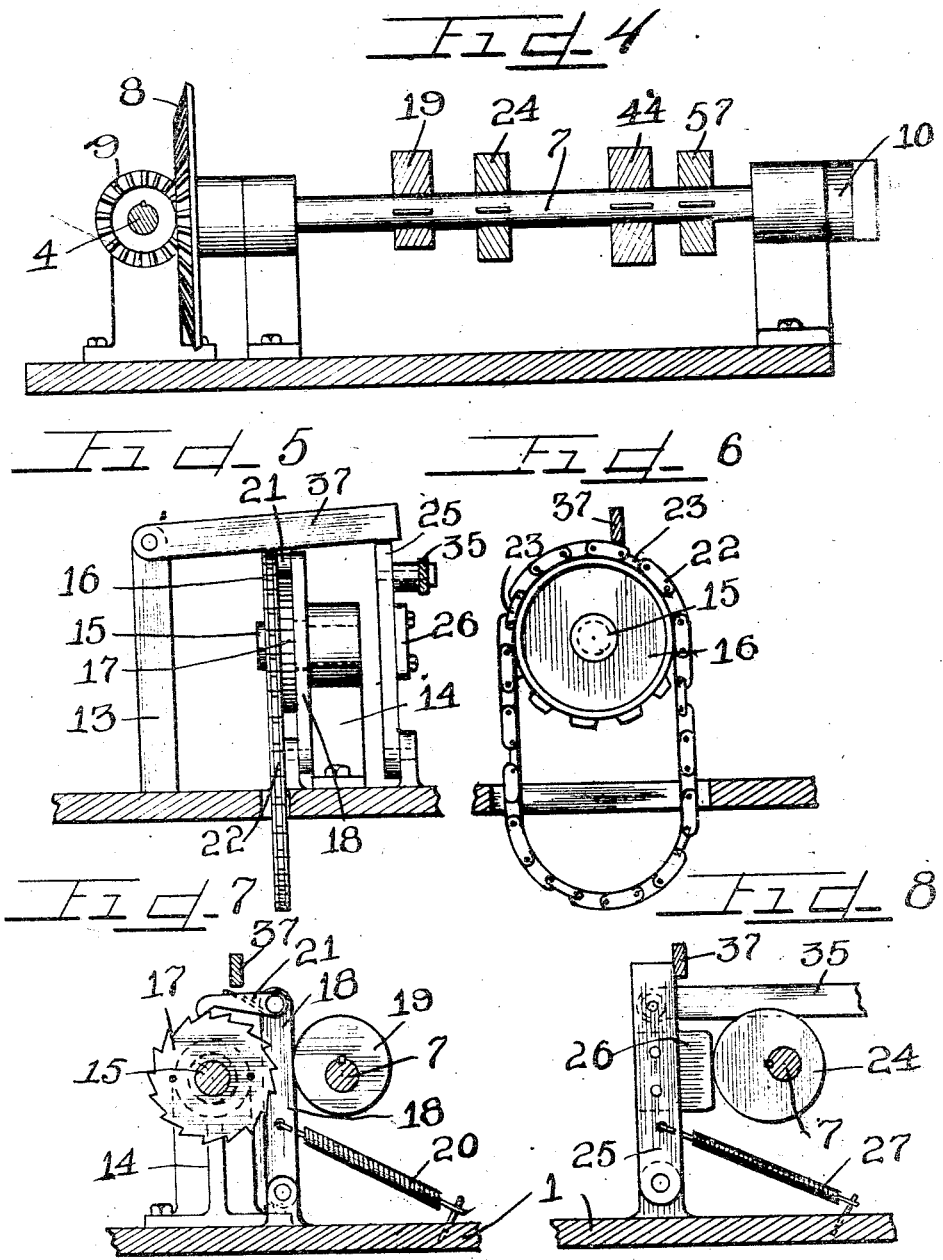

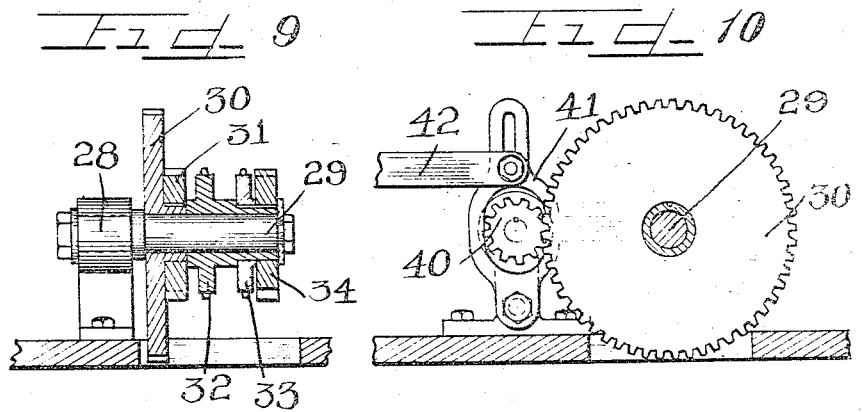
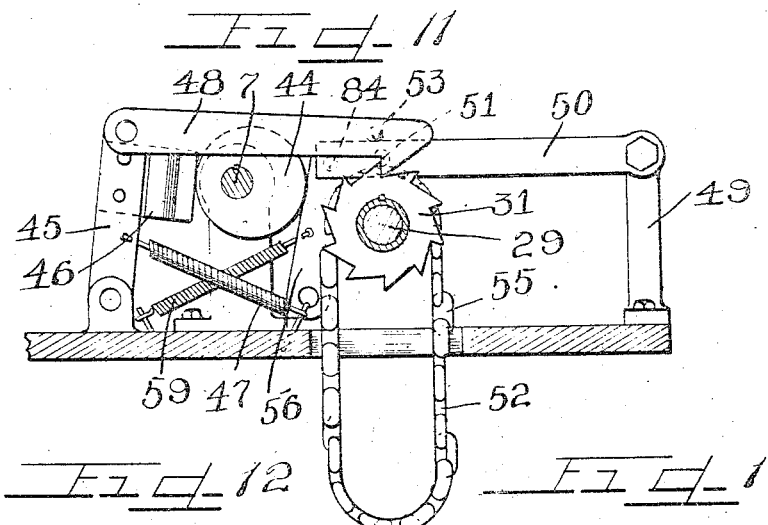
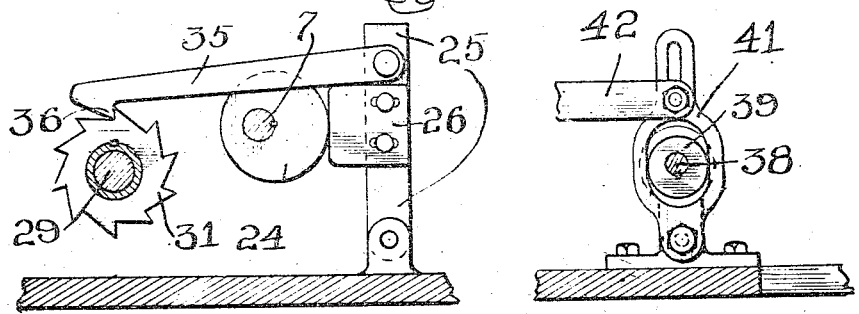

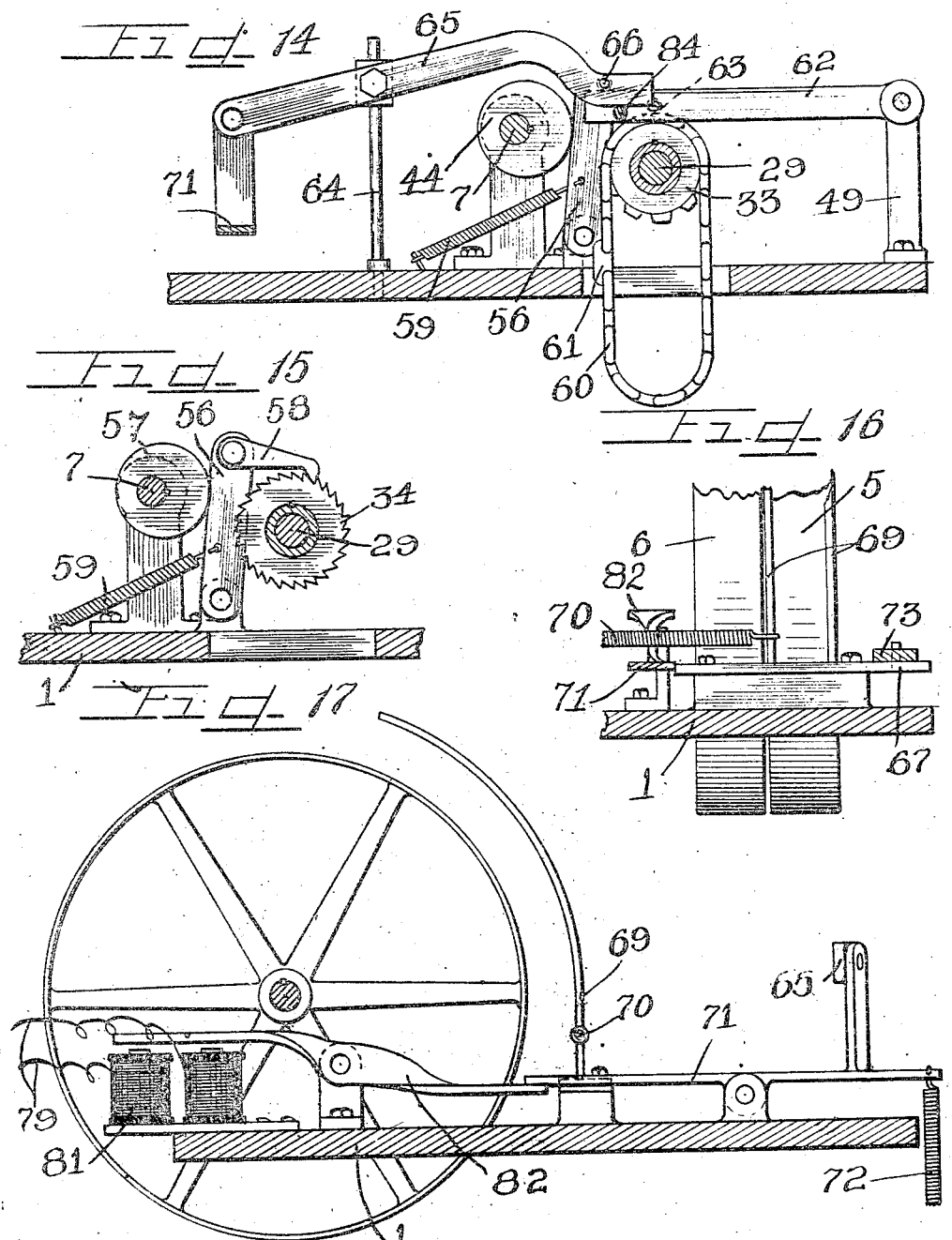

UNITED STATES PATENT OFFICE.

CARL F. SCHUESSLER, OF MONTAGUE, MICHIGAN.

POWER ATTACHMENT FOR KNITTING-MACHINES.

1,135,212.     Specification of Letters Patent.     Patented Apr. 13, 1915.

Application filed November 15, 1909. Serial No. 527,987.

*To all whom it may concern:*

Be it known that I, CARL F. SCHUESSLER, a citizen of the United States, and a resident of the city of Montague, in the county of Muskegon and State of Michigan, have invented certain new and useful Improvements in Power Attachments for Knitting-Machines; and I do hereby declare that the following is a full, clear, and exact description of the same, reference being had to the accompanying drawings, and to the numbers of reference marked thereon, which form a part of this specification.

Knitting machines such as usually employed for knitting sweaters, sweater vests, and other articles in which a variation of the stitch is made at intervals for purposes of ornamentation, have usually heretofore been operated manually to vary the stitch, and in consequence have been slow in operation and also have usually required a special operator to each machine rendering the work expensive. Furthermore, where operated manually the work has not always been as perfect in execution as may be accomplished with a properly constructed power operated machine, such variations as occur through the negligence of an operator frequently culling the garment when completed.

The object of this invention is to afford a power attachment for machines of the class described and by means of which the machine is operated continuously to perform the entire work of knitting, including the ornamental or figured stitching frequently used.

It is also an object of the invention to afford a construction in which the ornamentation (or figuring of the garment by ornamental stitches) is accomplished without the attention of the operator and wholly automatically, enabling the machine to be set to produce any desired ornamentation and assuring in each garment an exact duplication of the other.

It is an important object of the invention to afford a mechanism whereby defective operation from any cause results in instantly throwing the machine out of action.

Furthermore, it is an object of the invention to afford a power attachment for machines of the class described provided with means for instantly stopping the machine should the yarn break, as, of course, sometimes occurs.

The invention embraces many novel features and consists in the matters hereinafter described and more fully pointed out and defined in the appended claims.

In the drawings: Figure 1 is a top plan view of a device embodying my invention, showing the same in connection with a familiar type of knitting machine. Fig. 2 is a side elevation thereof. Fig. 3 is an enlarged top plan view of the power attachment. Fig. 4 is a fragmentary section taken on line 4—4 of Fig. 3, with parts omitted. Fig. 5 is a fragmentary section taken on line 5—5 of Fig. 3. Fig. 6 is a fragmentary section taken on line 6—6 of Fig. 3, with parts omitted. Fig. 7 is a fragmentary section taken on line 7—7 of Fig. 3, with parts omitted. Fig. 8 is a fragmentary section taken on line 8—8 of Fig. 3, with parts omitted. Fig. 9 is a fragmentary section on line 9—9 of Fig. 3, with parts omitted. Fig. 10, is a fragmentary section on line 10—10 of Fig. 3. Fig. 11 is a fragmentary section on line 11—11 of Fig. 3, with parts omitted. Fig. 12 is a fragmentary section on line 12—12 of Fig. 3, with parts omitted. Fig. 13 is a fragmentary section on line 13—13 of Fig. 3, with parts omitted. Fig. 14 is a fragmentary section on line 14—14 of Fig. 3, with parts omitted. Fig. 15 is a fragmentary section on line 15—15 of Fig. 3, with parts omitted. Fig. 16 is a fragmentary section on line 16—16 of Fig. 3 with parts omitted. Fig. 17 is a section on line 17—17 of Fig. 3. Fig. 18 is an enlarged fragmentary detail of one of the needle bars.

As shown in the drawings: Said machine comprises a table 1, supported upon legs 2, constructed of cast metal or any suitable material. Supported upon said table is the knitting machine proper consisting of the ways 3, on which the sliding frame and needle bars of the machine are supported as is usual with hand operated machines of this type. Journaled upon said table is the driving shaft 4, provided at its outer end with tight and loose pulleys 5 and 6, adapted to receive a driving belt from any suitable source of power. Journaled transversely upon the table is a shaft 7, provided with a bevel gear 8, which meshes with a bevel pinion 9, on the shaft 4, as shown in Figs. 1 and 3. Rigidly secured on the end of said shaft 7, and opposite from the bevel gear 8, is a crank arm 10, having apertures therein to enable the length of throw thereof to be graduated, and pivotally engaged with the connecting rod 11, engaged on the rear end of the reciprocating knitting frame 12, so that normally the operation of said machine reciprocates the knitting frame or rocks the same forward and back continuously on said ways. The length of stroke or amplitude of movement of the knitting frame, of course, depends upon the adjustment of the connecting rod 11, with the crank arm 10, the apertures in said crank arm permitting the reciprocation to be adjusted to the width of the garment to be knitted.

Means are provided for varying the stitch automatically to afford ornamentation or for any other purpose. To accomplish this a standard 13, is rigidly secured upon the table between the actuating shaft 7, and the driving pulleys and a corresponding standard 14, is secured laterally thereof, and journaled on said standard 14, and directed toward the standard 13, is a shaft 15, having thereon a sprocket wheel 16, and a ratchet wheel 17, on the end thereof. Pivotally engaged upon the table is an upright lever 18, which is held at all times in engagement with the cam 19, on the shaft 7, by means of a pulling spring 20, as shown in Figs. 3 and 7. Said lever 18, is provided at its upper end with a spring pawl 21, which engages the ratchet wheel 17, as shown in Figs. 3 and 7, and which, under the impulse given to said lever by said cam, actuates the ratchet wheel to rotate the same, one tooth with each rotation of the shaft 7.

Trained over the sprocket wheel 16, is the master or pattern chain 22. This, as shown, comprises a plurality of links of substantially uniform length, but varying in width to correspond with the pattern to be knitted in the garment, that is to say, at intervals in the length of the chain dependent upon the pattern, the arrangement of the links 23, corresponds to the pattern to be knitted.

Rigidly secured on the shaft 7, is a cam 24, as shown, arranged to throw oppositely from the cam 19, before described. Pivotally supported upon the table 1, is an upright lever 25, as shown in Figs. 3, 8, and 12, provided with an adjustable cam plate 26, thereon, which bears at all times against the cam 24, and as shown, a pulling spring 27, is engaged on said table and on said lever and acts to hold the same yieldingly at all times in operative relation with the cam.

Secured on the table in advance of the shaft 7, is an upwardly directed bracket 28, on which is rigidly engaged a stud shaft 29, which extends transversely the table between the shaft 7, and the knitting machine proper. Journaled on said stud shaft is a gear wheel 30, having keyed on the hub thereof a ratchet wheel 31, having the teeth thereof directed counter-clockwise, as shown in Fig. 12. Also journaled on said stud shaft is a sprocket wheel 32, having keyed on the hub thereof a sprocket wheel 33, and a ratchet wheel 34, the teeth of the latter of which are directed oppositely to those of ratchet 31. Secured on said lever 25, near the top thereof is a bar 35, which projects over the shaft 7, and alongside the gear wheel 30, and is provided with a downwardly extending hook or claw 36, which engages the ratchet wheel 31, to rotate the same with the reciprocation of the lever 25, by said cam 24.

Pivotally engaged on the standard 13, and resting intermediate its ends on the sprocket chain 22, is a stop lever 37, the end of which extends above the pivoted lever 25, and normally is supported above and out of engagement therewith on the wider links of the chain 22, but which at each of the narrow links 23, drops downwardly and engages said lever, as shown in Fig. 8, to hold the same from reciprocation until said lever is again raised by a succeeding wider link.

Secured on a stud shaft 38, between the stud shaft 29, and the knitting mechanism is a cam 39, and also a pinion 40, which meshes with the gear wheel 30, and pivotally engaged on said table is a forwardly directed cam lever 41, affording an oval yoke within which said cam 39, fits so that said lever is reciprocated longitudinally of the table by the rotation of the cam. Said lever is longitudinally slotted at its upper end and adjustably engaged therein to vary the stroke is a connecting rod or bar 42, pivotally engaged on the forward end of one of the knitting bars 43. The relative size of said gear and pinion is such, that, when the reciprocating bar 35, rotates the ratchet 31, one tooth, the rotation of said gear is sufficient to rotate the pinion 40, and consequently the cam 39, one half of a revolution and the throw of said cam is proportionate to shift said needle bar a distance equal to that between adjacent needles, while the next succeeding reciprocation of the bars 35 and 48, or, in other words, the next complete rotation of the shaft 7, completes the rotation of said cam 39, thereby returning the needle bar to normal position.

It sometimes occurs that it is desirable to shift the needle bar forward and back during one rotation of the driving shaft 7, and for this purpose, mechanism is provided to afford the return movement of the needle bar before the bar or pawl 35, could accomplish the same. For this purpose, as shown, a cam 44, is secured on the shaft 7, and directed oppositely from the cam 24.

Fulcrumed on the table on the same side of the shaft 7, with the lever 18, and 25, before described, is an upstanding lever 45, provided with an adjustable bearing plate 46, identical in all respects with that shown in Fig. 12, on the lever 25, and as shown, said bearing plate is at all times held in positive engagement with the cam by means of a spring 47, engaged on said lever and on the table. Pivotally engaged at the upper end of said lever is a pawl bar 48, which rests at all times upon the ratchet wheel 31, before described, and acts to rotate the same one tooth with each rotation of the cam 44, the rotation occasioned by said pawl bar 48, occurring during the forward movement of the pawl bar 35, before described, and, owing to the relative size of said gear and sprocket wheel and the throw of the cam 39, before described, the needle bar is shifted forward and back a distance between adjacent needles during each rotation of the shaft 7, when both of said pawl bars are in operation. Means are provided for throwing said pawl bar 48, out of engagement with the ratchet wheel 31, to vary the stitch. For this purpose, as shown, a standard 49, is secured upon the table adjacent the end of the knitting mechanism and pivotally engaged thereon is a lever 50, which projects rearwardly toward the shaft 7, and is provided with a laterally directed pin 51, shown in Fig. 3, and in dotted lines in Fig. 11, and which rests upon a pattern chain 52, trained about the sprocket wheel 32, on the stud shaft 29, and which comprises as before described, links of uniform length but of different width, and as shown in Fig. 3 (and in Fig. 11 in dotted lines), a pin 53, projecting laterally from the pawl bar 48, extends over the bar 50, so that as said bar is raised the pawl bar is elevated above and out of engagement with the ratchet wheel. In this instance, as shown, the wider links 55, serve to disengage the pawl bar 48, from the ratchet wheel to prevent the same shifting the needle bar said links being disposed throughout the length of the chain at suitable intervals apart dependent upon the pattern to be manufactured. Said pattern chain is actuated as follows: A lever 56, is fulcrumed on the table in positive bearing with the cam 57, secured on the shaft 7, as shown in Figs. 3 and 15, and between said cam and the ratchet wheel 34. A spring pressed pawl 58, is provided on the upper end of said lever and engages said ratchet wheel to rotate the same one tooth with each rotation of the shaft 7, as before described with reference to the actuation of the ratchet wheel 17. A pulling spring 59, is engaged on the table and on said lever to hold the same at all times in positive bearing against the cam.

As shown, means are provided for shifting the belt when the pattern is completed. For this purpose, a shifting chain 60, is trained about the sprocket wheel 33, on the stud shaft 29, and is provided with a single raised link 61, and pivotally engaged on the standard 49, is a lever 62, which projects rearwardly toward the shaft 7, and is provided with a laterally directed finger 63, which rests upon said chain. Secured on the table at the rear of the shaft 7, is a standard 64, on the upper end of which is adjustably fulcrumed a lever 65, one end of which projects over the cam-shaft and its cams and is provided with a laterally directed pin 66, which rests on the end of the lever 62, so that as said lever or bar 62, is elevated the rear end of the lever 65, is thrown downwardly and suitable mechanism is provided to shift the belt from the tight to the loose pulley by this movement.

The shifting of the belt may be accomplished in numerous ways, and in the construction shown a plate 67, is slidably secured upon the table by means of stud bolts 68, extending through suitable slots therein and engaging in the table, and secured on said shifting plate are upwardly extending guide fingers 69, which engage one on each side of the belt in the usual manner to shift the same when the shifting plate is actuated. A strong pulling spring 70, is secured to any rigid part of the frame or table and to said plate to shift the belt when said plate is released.

Fulcrumed on the table is a lever 71, with which the rear end of the lever 65, is pivotally connected, as shown in Fig. 17, the front end of the lever 65 being heavy enough to hold the lever 71 in position normally to afford a stop for the shifting plate when the belt is on the tight pulley, as shown in Figs. 16 and 17. With this construction the elevation of the forward end of the lever 65, serves to depress the outer end of the lever 71, thus permitting the spring 70, to shift the belt. As shown, also, a shifting lever 73, is pivotally engaged upon the table and engages said shifting plate 67, for the purpose of shifting the belt from the loose to the tight pulley.

Mechanism is provided for automatically shifting the belt should the yarn break. For this purpose, as shown, standards 74, are supported on the table connected at their upper ends by a metallic bar or rod 75, upon which is adjustably secured a metallic resilient tension arm 76. Extending upwardly and supported on the posts or rods 74, are insulating posts 77, connected at their upper ends by a metallic rod or wire 78, adapted to be engaged by a resilient tension arm 76, should the tension thereon be released by the breaking of the yarn. Lead wires 79, lead from the metallic rods 75 and 78, through a suitable battery 80, or other source of current, to an electro-magnet 81, so that the circuit being completed through the tension arm, said electro-magnet becomes energized.

Pivotally engaged on the table is a lever 130

82, one end of which extends beneath the inner end of the lever 71, and the other end of which extends over the electro-magnet and serves as an armature therefor, so that when the electro-magnet is energized, the detent lever 71, is elevated and the shifting belt released.

Any suitable switch 83, may be provided upon the table in convenient access of the operator to enable the circuit to be discontinued when the machine is not in operation.

As shown, a finger 84, is secured on the lever 50, and projects beneath the end of the lever 65, and is adapted to elevate the same to shift the belt, should it be desired to do the same with the chain 52. In that event, of course, a link of sufficient thickness is provided in said chain to indicate the termination of said pattern and adapted to elevate said lever sufficiently high as before described with reference to the link 61, in the chain 60, to effect the shift.

The operation is as follows: For plain work without fancy stitching or figures, the continuous rotation of the shaft 7, reciprocates the knitting frame forward and back on the machine a distance equal to the width of the garment to be made, the throw being regulated by suitably connecting the rod 11, in the crank 10. When so arranged this may continue for any desired number of rotations of the shaft, dependent upon the pattern. When it is desired to produce a figured stitch, links of different size are provided at the proper point in the chains 22, and 52, the character of the link depending upon which chain is to afford the change in the pattern. If in the chain 22, thicker links are inserted serving to hold the lever 37, out of engagement with the lever 25, thus permitting the cam 24, to reciprocate the pawl bar 35, each reciprocation as before described, and, owing to the relative size of the gear 30, and pinion 40, shifting the needle bar longitudinally a distance equal to the interval between two adjacent needles. The next reciprocation of the pawl bar due to a complete rotation of the shaft 7, acts to return said needle bar to normal position. To afford the double shift during a single rotation of the driving shaft 7, or, in other words, to shift the needle bar and return the same to normal during a single rotation both pawl bars are permitted to operate and, inasmuch as the throw of the cams 24, and 44, are opposite from each other, one cam is actuating said gear while the pawl bar actuated by the other is being retracted, and vice versa, each affording a half rotation of the cam 39, it follows that a complete rotation of said cam is effected by a joint rotation of said pawl bars during each rotation of the shaft 7. Any change in the stitch from fancy or figured to plain is accomplished by throwing said pawl bars out of operation in the one instance by means of the lever 37, engaging before the lever 25, to hold the same from the cam and in the other by the elevation of the pawl bar 48, on the lever 50, because of the said lever being elevated on links of greater width in the chain 52. In this manner the figure or pattern to be knit in the garment may be varied through a wide extent by simply varying the arrangement of links in the respective chains.

At the end of the pattern the machine is instantly thrown out of gear by means of the lever 62, which is elevated upon a thicker link in the shifting chain 60, or a link of greater thickness may be provided in the chain 52, and acting to lift the lever 50, sufficiently high to trip the detent lever 71 through the agency of the pin 84 and lever 65. In either event, the detent lever being released, a spring 70, acts to instantly shift the belt from the tight to the loose pulley necessitating the stoppage of the machine.

The machine is also instantly stopped by the breaking of the yarn. This is a matter of great importance, inasmuch as otherwise the garment may be injured or the tension being removed, a portion of the garment may be knitted too loosely necessitating a portion thereof being raveled occasioning a waste of time. Breakage of the yarn obviously releases the lever 76, previously under tension. This flying up, contacts the rod 78, completing a circuit with the electro-magnet and immediately releases the detent lever 71, and permitting the belt to shift. The shifting may also be effected by a weight 85, supported on the bottom part of the garment, as shown in Fig. 2. This, in descending as the garment approaches completion, may engage a lever 86, and produce tension upon a normally inactive spring or other connection 72, connected with the trip lever 71. When the garment is completed said tension has become sufficient to release the detent lever or to assist the lever 65, in releasing the same. In this manner every safeguard has been provided to insure perfect work, economy in material and the immediate stoppage of the machine when the pattern is completed.

Obviously with machines so equipped a single operator may operate a number of machines, inasmuch as all the operations are automatically performed and inasmuch as no defect, mistake or injury can occur in the knitting of the pattern without the machine being instantly thrown out of action.

In consequence of the highly automatic character of the power attachment, great economy in operation and production is effected and lost time is practically eliminated as the machine can almost instantly be set to continue the operation after each shift of the belt and, inasmuch as the machine requires practically no supervision during its operation.

Of course, numerous details of the construction may be varied.

Although I have shown but one practical embodiment of my invention, I do not purpose limiting myself otherwise than necessitated by the prior art, for obviously any suitable mechanisms may be employed for shifting the belts and the particular arrangement of cams and levers and other mechanisms to accomplish the purposes hereinbefore described may vary through a wide range without departing from the principles of this invention.

I claim as my invention:

1. In a machine of the class described, a driven shaft, a reciprocating operating means actuated thereby, a ratchet and gear wheels driven thereby, a reciprocatable needle bar, adjustable connections between said gear wheels and needle bar for varying the reciprocation thereof with each actuation of the reciprocating operating means, means for preventing reciprocation of said reciprocating operating means in accordance with a predetermined pattern.

2. In a device of the class described, a reciprocating knitting bar, a plurality of reciprocating mechanisms adapted to coöperate to actuate the knitting bar for one style of stitch, and separate means for adjusting either of the mechanisms out of operation for varying the stitch, one of said means embodying a stop lever for preventing the reciprocation of the mechanism with which it coöperates.

3. In a device of the class described, a reciprocating knitting bar, a plurality of reciprocating mechanisms adapted to coöperate to actuate the knitting bar for one style of stitch, separate means for adjusting either of the mechanisms out of operation for varying the stitch, one of said means embodying a stop lever for preventing the reciprocation of the mechanism with which it coöperates, and variable master chains for controlling the operation of said means.

In testimony whereof I have hereunto subscribed my name in the presence of two subscribing witnesses.

CARL F. SCHUESSLER.

Witnesses:
  HANS C. FLATEN,
  CHRISTIAN L. STRENG.